(12) United States Patent
Denison et al.

(10) Patent No.: US 12,552,221 B2
(45) Date of Patent: Feb. 17, 2026

(54) DYNAMIC MANAGEMENT OF VEHICLE FUNCTIONS ACCORDING TO POWER DEMAND

(71) Applicant: Cummins Inc., Columbus, IN (US)

(72) Inventors: Nathan Denison, Columbus, IN (US); Scott Alan Rittenhouse, Nashville, IN (US); Richard A. Booth, Columbus, IN (US); Sweekar Pandit, Columbus, IN (US)

(73) Assignee: Cummins Inc., Columbus, IN (US)

( * ) Notice: Subject to any disclaimer, the term of this patent is extended or adjusted under 35 U.S.C. 154(b) by 137 days.

(21) Appl. No.: 18/372,496

(22) Filed: Sep. 25, 2023

(65) Prior Publication Data

US 2024/0100906 A1  Mar. 28, 2024

Related U.S. Application Data

(60) Provisional application No. 63/410,463, filed on Sep. 27, 2022.

(51) Int. Cl.
*B60H 1/00* (2006.01)

(52) U.S. Cl.
CPC ................. *B60H 1/00278* (2013.01)

(58) Field of Classification Search
CPC ................................. B60H 1/00278
USPC ........................................ 165/202
See application file for complete search history.

(56) References Cited

U.S. PATENT DOCUMENTS

| | | | |
|---|---|---|---|
| 5,568,052 A | 10/1996 | Sway-Tin et al. | |
| 9,437,058 B2 | 9/2016 | Luke | |
| 10,562,372 B2 | 2/2020 | Hansson et al. | |
| 11,465,533 B2 | 10/2022 | Zhao et al. | |
| 2013/0269921 A1* | 10/2013 | Kusumi | B60H 1/00764 165/42 |
| 2020/0215869 A1 | 7/2020 | Shin et al. | |
| 2021/0086745 A1 | 3/2021 | Books et al. | |

FOREIGN PATENT DOCUMENTS

| | | | | |
|---|---|---|---|---|
| CN | 1463867 A | | 12/2003 | |
| CN | 106061784 A | * | 10/2016 | ............. B60K 17/28 |
| CN | 114116580 A | * | 3/2022 | ............. B60L 53/62 |

(Continued)

*Primary Examiner* — Davis D Hwu
(74) *Attorney, Agent, or Firm* — Faegre Drinker Biddle & Reath LLP

(57) ABSTRACT

The present disclosure includes devices, systems, and methods for managing vehicle functions according to power demand by vehicle subsystems. Example methods include receiving available power data indicating available vehicle battery power, the vehicle having vehicle subsystems. Methods include receiving demand data indicating a battery power demand by the vehicle subsystems that perform vehicle functions. Methods include receiving modification data associated with modifying the vehicle functions. Methods include determining, at a first time, based on the demand data and the available power data, that the power demand exceeds the available power. Methods include selecting, in response to that determining, target vehicle functions among the vehicle functions. Methods include selecting, based at least in part on the modification data, modifications for the target vehicle functions. Methods include initiating the modifications to the target vehicle functions.

20 Claims, 7 Drawing Sheets

(56) References Cited

FOREIGN PATENT DOCUMENTS

| | | |
|---|---|---|
| DE | 102014011798 A1 | 3/2015 |
| JP | 2011239629 A | 11/2011 |
| JP | 2014033523 A | 2/2014 |
| JP | 2018121463 A | 8/2018 |
| JP | 2021097567 A | 6/2021 |
| KR | 20040000724 A | 1/2004 |
| KR | 100448380 B1 | 9/2004 |
| WO | 2017100613 A1 | 6/2017 |
| WO | 2023033762 A1 | 3/2023 |

\* cited by examiner

DYNAMIC MANAGEMENT OF VEHICLE FUNCTIONS ACCORDING TO POWER DEMAND

CROSS-REFERENCE TO RELATED PATENT APPLICATIONS

This application claims the benefit of provisional priority to U.S. Provisional Patent Application No. 63/410,463, filed Sep. 27, 2022, the entire content of which is expressly incorporated herein by its reference.

FIELD

The present disclosure relates to management of vehicle functions, and more specifically, to management of vehicle functions according to power demand by one or more vehicle subsystems.

BACKGROUND

A plurality of vehicle subsystems can demand electrical power from a vehicle battery to perform one or more vehicle functions. A quantity of the available power of the vehicle battery can determine whether the vehicle subsystems can perform such vehicle functions.

SUMMARY

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
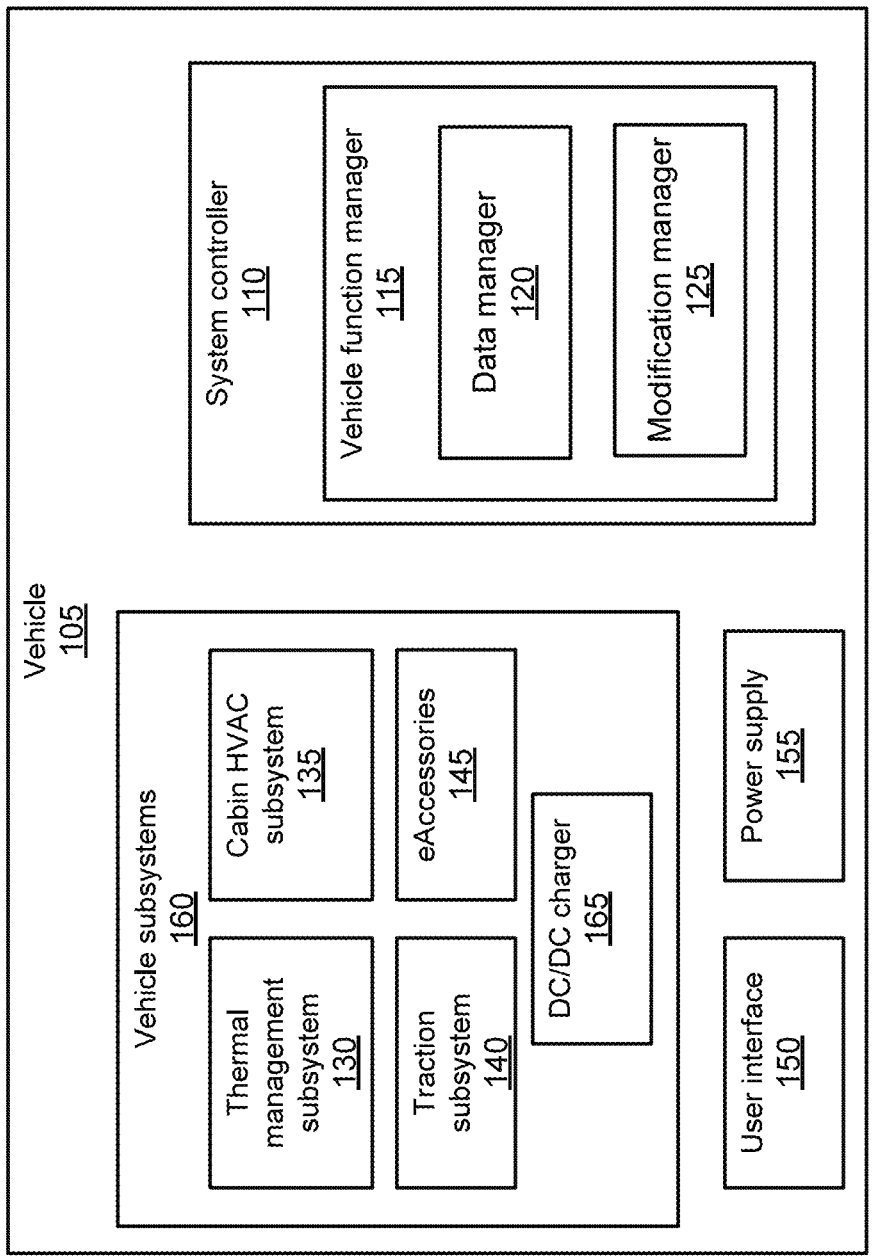
FIG. 1 depicts an example vehicle having a vehicle function manager, in accordance with embodiments of the present disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The present disclosure relates to management of vehicle functions; more particular aspects relate to management of vehicle functions according to power demand by one or more vehicle subsystems.

A vehicle, such as a battery electric vehicle, can include a high voltage battery as a primary power source for its vehicle subsystems. These vehicle subsystems, such as cabin heating, ventilation, and air conditioning ("cabin HVAC") subsystems, power steering subsystems, traction subsystems, and battery thermal management subsystems, can each demand electrical power from the battery. Such demand can be dynamic, as it can vary according to the circumstances under which a particular vehicle subsystem performs a vehicle function. For example, a vehicle traction subsystem can demand significantly more power during a period of steep uphill travel by the vehicle than it would demand during a period of downhill travel by the vehicle. In some instances, a system controller of the vehicle can manage the battery's available power among a plurality of vehicle subsystems.

In some instances, managing the battery's available power to accommodate dynamic power demands can present challenges. For example, a bus can have a 150 kW battery as a power source. The bus can further include a plurality of vehicle subsystems, including a traction subsystem. At a first time, the traction subsystem can demand 100 kW of power, and the remaining vehicle subsystems can demand 40 kW of power. At a second time, due to changed transit conditions (e.g., traffic and/or uphill travel), the traction subsystem can demand 120 kW of power, while the remaining vehicle subsystems continue to demand 40 kW of power. In this scenario, the increased power demand by the traction subsystem would cause the total power demand by the plurality of vehicle subsystems (i.e., 160 kW) to exceed the available power of the battery (i.e., 150 kW), resulting in an available-power deficit of 10 kW. Such an available-power deficit can result in deficient performance by the traction subsystem. Additionally, a design to prevent such an available-power deficit by equipping the vehicle with a battery having a greater available power can result in increased vehicle weight and/or cost.

To address these and other challenges, embodiments of the present disclosure include a vehicle function manager. In some embodiments, the vehicle function manager can automatically modify (e.g., change a performance of) one or more predetermined vehicle functions in response to determining that a power demand by one or more vehicle subsystems exceeds a threshold. In some embodiments, the vehicle function manager can automatically select a manner in which to modify one or more vehicle functions. By such modifying, embodiments of the present disclosure can dynamically increase a quantity of battery power available to a vehicle subsystem in response to determining the presence of an available-power deficit. Accordingly, embodiments of the present disclosure can facilitate improved performance by one or more vehicle subsystems in the presence of an available-power deficit. For example, in the scenario discussed above, a vehicle function manager can modify the vehicle functions performed by the remaining vehicle subsystems such that their power demand is reduced to 20 kW. In this example, the reduced power demand would eliminate the available-power deficit and permit the traction subsystem to access 120 kW of power from the battery. Additionally, by such modifying, embodiments of the present disclosure can facilitate improved utilization of a battery's available power. In some instances, such improved utilization can permit a battery having a lower available power (e.g., 150 kW) to be employed in place of a battery having a higher available power (e.g., 200 kW). In some instances, such improved utilization can permit a battery having a lower weight to be employed in place of a battery having a higher weight.

Turning to the figures, FIG. 1 illustrates a system 100 that includes a vehicle 105, such as a battery electric vehicle or a fuel cell electric vehicle. In some embodiments, vehicle 105 can include an automobile, such as a sedan, and in some embodiments, vehicle 105 can include a bus or a truck. Vehicle 105 includes a set of vehicle subsystems 160 that can each demand power from power supply 155 to perform a set of (i.e., one or more) vehicle functions (e.g., vehicle tasks). For example, thermal management subsystem 130 can demand power from power supply 155 to perform vehicle functions such as heating or cooling the power supply 155 and/or cooling components of the powertrain, such as electronic accessories 145 and a traction motor (not shown). In some embodiments, thermal management subsystem 130 can include one or more fans and/or one or more pumps for circulating a coolant fluid. Cabin HVAC subsystem 135 can demand power from power supply 155 to perform vehicle functions such as heating or cooling a vehicle cabin (not shown) (e.g., an area inside the vehicle 105 that can be occupied by an operator and passengers during transportation by the vehicle). In some embodiments, cabin HVAC subsystem 135 can include one or more fans and/or one or more pumps for circulating a coolant fluid, such as refrigerant. In some embodiments, cabin HVAC subsystem 135 can include one or more electric heaters. In some embodiments, such electric heaters can be configured to heat a vehicle cabin by heating a coolant that flows through heat exchangers within the vehicle cabin. Traction subsystem 140 can demand power from power supply 155 to perform vehicle functions such as providing tractive power to the vehicle 105. For example, in some embodiments, traction subsystem 140 can convert electrical energy from the power supply to mechanical energy delivered to a drive axle (not shown) to drive the vehicle 105. In some embodiments, traction subsystem 140 can perform regenerative braking to recover kinetic energy from the vehicle 105 and store as electrical energy in power supply 155. Electronic accessories 145 can demand power from power supply 155 to perform vehicle functions such as steering and braking assistance. For example, in embodiments in which vehicle 105 has hydraulic brakes, electronic accessories 145 can include an electric hydraulic pump to provide power steering assistance and braking assistance. In embodiments in which vehicle 105 has a pneumatic braking system, electronic accessories 145 can include an electric air compressor for the pneumatic braking system. DC/DC charger 165 can perform a vehicle function such as providing low-voltage power (e.g., approximately 12V) to the vehicle chassis (not shown). User interface 150 can include a climate control panel as well as accelerator and brake pedals. In some embodiments, user interface 150 can include a vehicle cruise control system. In some embodiments, user interface 150 can include a pedal position sensor. In some embodiments, power supply 155 can include an electric battery pack, and in some embodiments, power supply 155 can include a fuel cell stack. In some embodiments, one or more of the vehicle subsystems 160 and/or power supply 155 can include one or more sensing devices (not shown), such as a temperature sensor.

System controller 110 can include a software application for managing the operation of vehicle subsystems 160. System controller 110, vehicle subsystems 160, user interface 150, and/or power supply 155 can include a computing device, such as computing device 400 discussed with respect to FIG. 4. System controller 110 can include a vehicle function manager 115. In some embodiments, vehicle function manager 115 can be a software application installed on a computing device of system controller 110. For example, vehicle function manager 115 can be included as a plug-in software component of system controller 110. Vehicle function manager 115 can include program instructions implemented by a processor, such as a processor of system controller 110, to perform one or more operations discussed with respect to FIGS. 2 and 3. Vehicle function manager 115 can include modules such as data manager 120 and modification manager 125. In some embodiments, data manager 120 can include program instructions to perform operations 205-220, FIG. 2. In some embodiments, modification manager 125 can include program instructions to perform operations 225-255, FIG. 2. In some embodiments, data manager 120 can include program instructions to perform operations 305-320, FIG. 3. In some embodiments, modification manager 125 can include program instructions to perform operations 325-345, FIG. 3.

Figure 2:
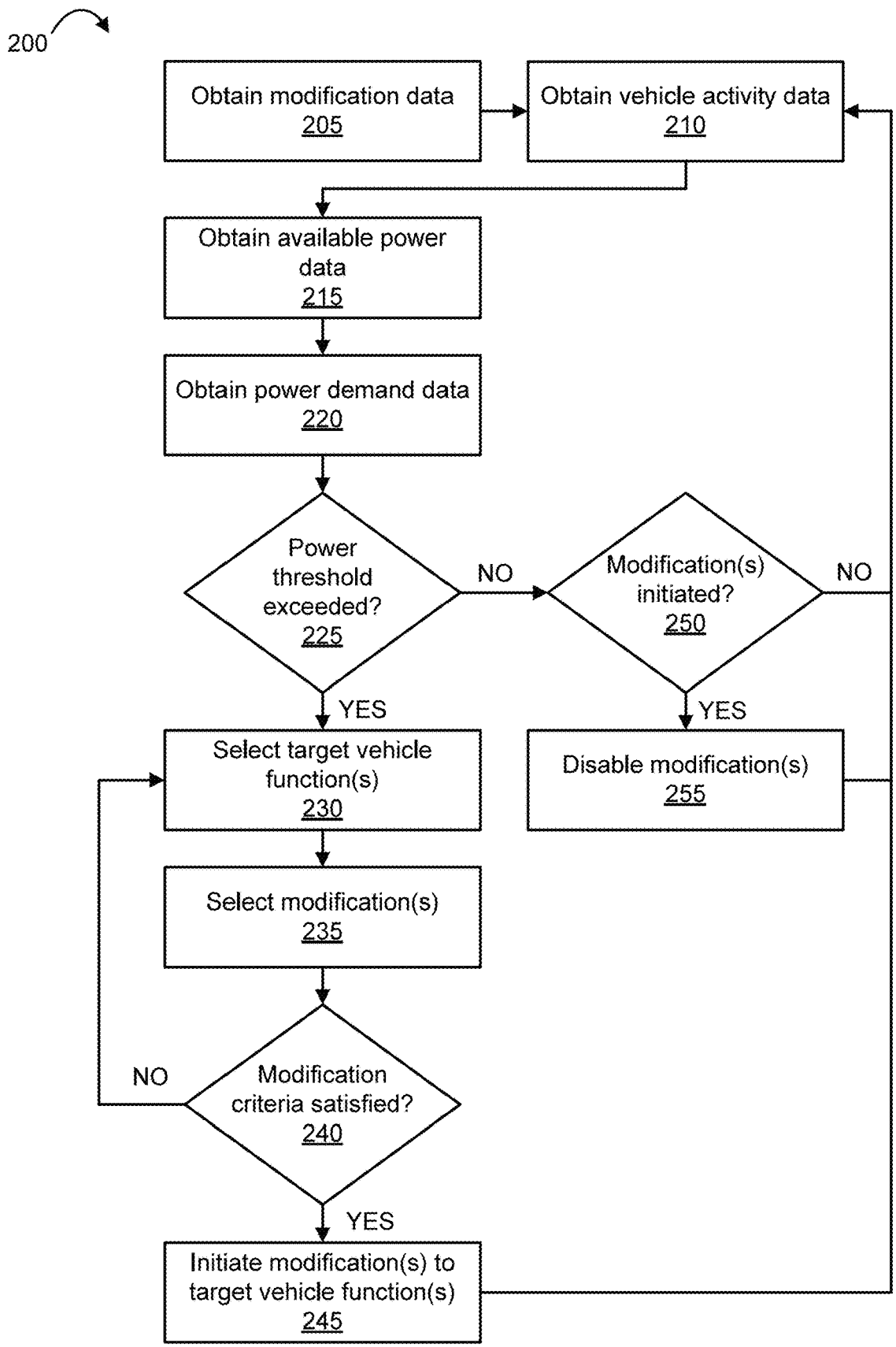
FIG. 2 depicts a flowchart of an example method for dynamic management of one or more vehicle functions, in accordance with embodiments of the present disclosure.

FIG. 2 illustrates a flowchart of an example method 200 for dynamic management of one or more vehicle functions, in accordance with embodiments of the present disclosure. Method 200 can be performed automatically by vehicle function manager 115, FIG. 1. In some embodiments, vehicle function manager 115 can perform method 200 continuously. In some embodiments, vehicle function manager 115 can perform method 200 intermittently. For example, vehicle function manager 115 can perform method 200 at intervals of approximately 20 to 50 milliseconds.

Referring back to FIG. 2, in operation 205, the vehicle function manager obtains (e.g., receives or retrieves) modification data. Modification data can include information associated with modifying a set of vehicle functions. For example, in some embodiments, modification data can include program instructions that indicate a manner in which set of vehicle functions is to be modified. For example, in some instances, such program instructions can indicate that heating of a vehicle cabin by a cabin HVAC subsystem is to be reduced by a predetermined extent (e.g., changing a vehicle cabin temperature setting from 30° C. to 20° C.). In some instances, such program instructions can indicate that such heating of the vehicle cabin is to be terminated.

In some embodiments, modification data can include a set of rankings corresponding, respectively, to a set of vehicle functions. In these embodiments, a ranking corresponding to a vehicle function can indicate a degree of priority of the vehicle function relative to other vehicle functions. For example, in some instances, maintaining a battery coolant temperature, a function that can be performed by a thermal management subsystem, can have a numerical ranking of "1." Additionally, cooling a vehicle cabin, a function that can be performed by a cabin HVAC subsystem, can have a numerical ranking of "2." In this example, the lower numerical ranking can indicate a higher degree of priority; thus, maintaining the battery coolant temperature can have a higher degree of priority than cooling the vehicle cabin.

In some embodiments, modification data can include modification criteria. Modification criteria can refer to a set of conditions to be satisfied to enable the vehicle function manager to initiate a modification to a target vehicle function. A target vehicle function can refer to a vehicle function (e.g., a vehicle task) to be modified by the vehicle function manager. In some embodiments, the use of modification criteria can mitigate potential safety hazards associated with modifying vehicle functions. For example, in some embodiments, modification criteria can include conditions such as determining that a battery temperature is below a threshold temperature before reducing power to a pump of the thermal management subsystem or disabling a refrigerant compressor of the thermal management subsystem. Absent the condition, such modifications could reduce the thermal management subsystem's ability to cool the battery such that the battery would be susceptible to thermal runaway. Similarly, in another example, modification criteria can include a condition such as determining that the temperature of the traction motor of the traction subsystem does not exceed a threshold temperature before reducing power to a pump of the thermal management subsystem and thereby reducing its ability to cool the traction motor. In another example, modification criteria can include determining that a speed of the vehicle exceeds a threshold before reducing power to a pump of the thermal management subsystem. In another example, modification criteria can include determining (e.g., by vehicle activity data) that a grade of a roadway traversed by the vehicle does not exceed a threshold before reducing power to a hydraulic pump associated with power steering or an air compressor associated with assisted braking.

In some embodiments, modification data can be selected by an entity, such as a programmer of the vehicle function manager, and stored in memory of a computing device, such as a computing device of a system controller.

In operation 210, the vehicle function manager obtains vehicle activity data. Vehicle activity data can include information about the operation of the vehicle. For example, in some embodiments, vehicle activity data can include accelerator pedal position and/or torque response rate of a traction motor of the traction subsystem. In some embodiments, vehicle activity data can include information such as a speed of the vehicle, a temperature of the power supply and/or other components of the vehicle, and/or a temperature of coolant utilized by the thermal management subsystem and/or the cabin HVAC subsystem. In some embodiments, the vehicle function manager can obtain vehicle activity data from one or more vehicle subsystems and/or sensors of the vehicle.

In operation 215, the vehicle function manager obtains available power data. Available power data can indicate a quantity of power that a power supply can provide to a set of vehicle subsystems at a particular time. In some embodiments, the vehicle function manager can obtain available power data from the power supply, a battery management system associated with the power supply, and/or from the system controller. In some embodiments, the available power data can include power from regenerative braking by the traction subsystem.

In operation 220, the vehicle function manager obtains power demand data. Power demand data can indicate a power demand of a power supply by a set of vehicle subsystems at a particular time. For example, in some embodiments, power demand data can indicate that at a first time, a traction subsystem demands 100 kW of power from a vehicle battery and a thermal management subsystem demands 40 kW of power from the vehicle battery. Additionally, power demand data can indicate that at a second time, subsequent to the first time, the traction subsystem demands 120 kW of power from the vehicle battery and the thermal management subsystem demands 50 kW of power from the vehicle battery. In some instances, power demand data can indicate that a subsystem is not demanding power from the power supply (e.g., the subsystem is powered off and/or not performing a vehicle function). In some embodiments, the vehicle function manager can obtain power demand data from a system controller of the vehicle and/or one or more vehicle subsystems. In some embodiments, the vehicle function manager can determine the power demand of the traction subsystem based on an accelerator pedal position and a motor speed of the traction subsystem.

In operation 225, the vehicle function manager determines whether a power threshold is exceeded. In some embodiments, operation 225 can include the vehicle function manager comparing power demand data obtained in operation 220 to available power data obtained in operation 215 and determining whether a power demand of a power supply is greater than an available power of the power supply. In response to determining that such a threshold is exceeded, the vehicle function manager can proceed to operation 230. Alternatively, in response to determining that such a threshold is not exceeded, the vehicle function manager can proceed to operation 250.

In operation 230, the vehicle function manager selects a set of target vehicle functions corresponding to the set of vehicle subsystems demanding power from the power supply. In some embodiments, selecting the set of target vehicle functions is based, at least in part, on modification data obtained in operation 205. For example, continuing with the example discussed above, cooling a vehicle cabin can be selected as a target vehicle function because it has a lower degree of priority than maintaining a battery coolant temperature. In some embodiments, a plurality of vehicle functions can be selected as target vehicle functions. For example, in some instances, all vehicle functions corresponding to the subsystems demanding power from the power supply can be selected as target vehicle functions. In another example, in some instances, among three vehicle functions having, respectively, a first, second, and third degree of priority, the vehicle functions having the second and third degrees of priority can be selected as target vehicle functions. In some embodiments, selecting the set of target vehicle functions is based, at least in part, on power demand data obtained in operation 220. In some embodiments, selecting the set of target vehicle functions can exclude selecting the traction subsystem.

In operation 235, the vehicle function manager selects a set of modifications. In some embodiments, the vehicle function manager selects the set of modifications based, at least in part, on the modification data obtained in operation 205. In some embodiments, the vehicle function manager selects the set of modifications based, at least in part, on power demand data obtained in operation 220. Operation 235 can include the vehicle function manager determining a quantity of power that can be made available by implementing the set of modifications.

In operation 240, the vehicle function manager determines whether the modification criteria is satisfied. In some embodiments, determining whether the modification criteria is satisfied can include comparing vehicle activity data obtained in operation 210 to one or more thresholds of the modification criteria obtained in operation 205. In response to determining that the modification criteria is satisfied, the vehicle function manager can proceed to operation 245. Alternatively, in response to determining that the modification criteria is not satisfied, the vehicle function manager can proceed to operation 230 and subsequently select a different set of target vehicle functions and/or modifications.

In operation 245, the vehicle function manager initiates the set of modifications to the set of target vehicle functions. In some embodiments, operation 245 can include the vehicle function manager issuing one or more program instructions to a system controller of the vehicle. Such program instructions can command the system controller to modify the set of target functions. In some embodiments, operation 245 can include the vehicle function manager issuing one or more program instructions to one or more vehicle subsystems that correspond to the set of target vehicle functions. The one or more program instructions can command the one or more vehicle subsystems to modify the respective set of target functions. Operation 245 can include the vehicle function manager storing data to memory (e.g., to memory of the system controller) indicating that the set of modifications is initiated.

In operation 250, the vehicle function manager determines if a set of modifications is initiated. For example, in some embodiments, the vehicle function manager can obtain stored data from memory (e.g., memory of the system controller) indicating whether a set of modifications is initiated. In response to determining that a set of modifications is initiated, the vehicle function manager can proceed to operation 255. Alternatively, in response to determining that a set of modifications is not initiated, the vehicle function manager can proceed to operation 210.

In operation 255, the vehicle function manager disables, or removes, the set of modifications. In this way, the vehicle functions can revert to an unmodified state. In such an unmodified state, the vehicle subsystems of the vehicle can demand power from the power supply without limitation by the vehicle function manager.

Figure 3:
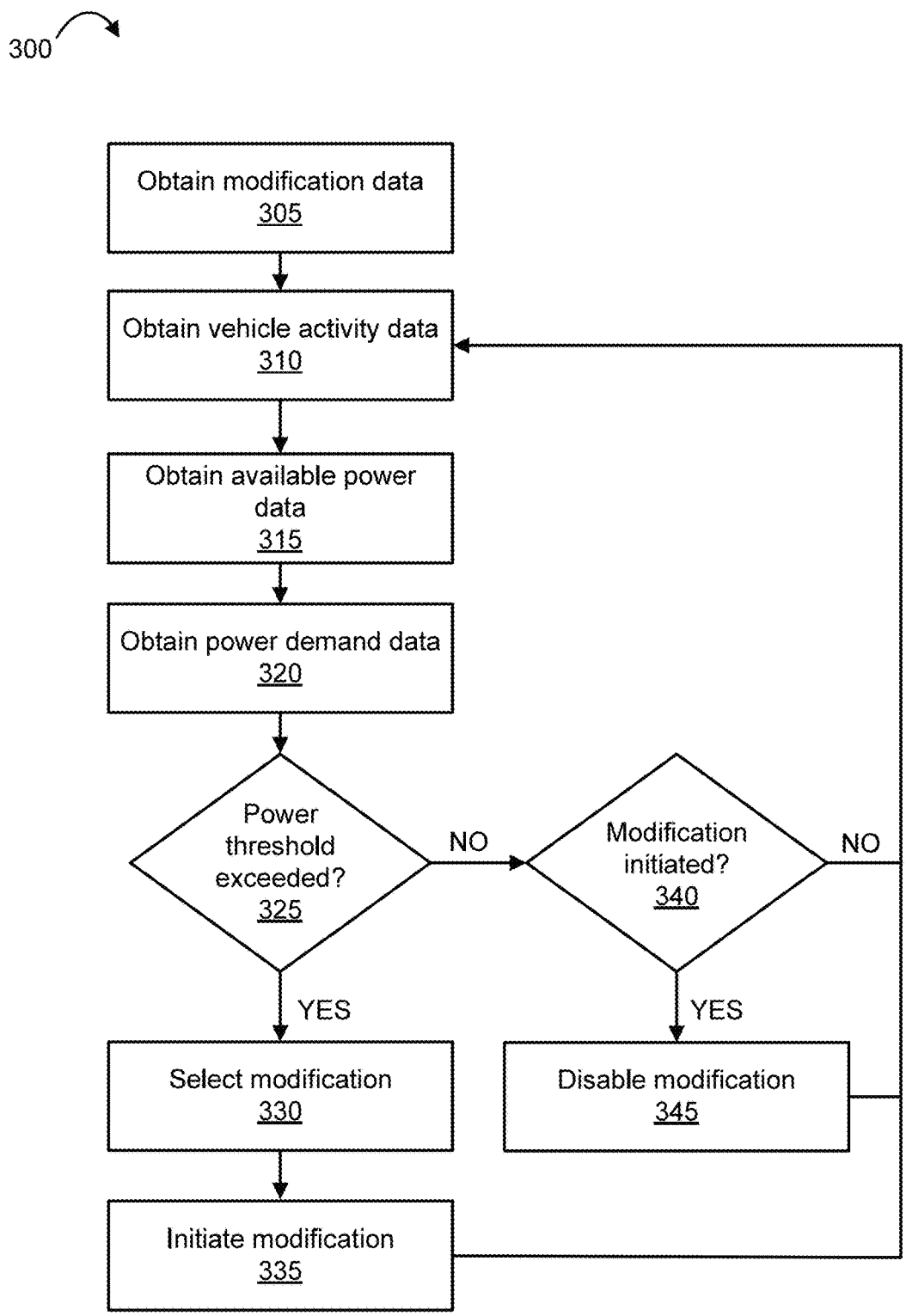
FIG. 3 depicts a flowchart of an example method for dynamic management of vehicle functions associated with a cabin HVAC subsystem, in accordance with embodiments of the present disclosure.

FIG. 3 illustrates a flowchart of an example method for dynamic management of vehicle functions associated with a cabin HVAC subsystem, in accordance with embodiments of the present disclosure. Method 300 can be performed automatically by vehicle function manager 115, FIG. 1. In some embodiments, vehicle function manager 115 can perform method 300 continuously. In some embodiments, vehicle function manager 115 can perform method 300 intermittently. For example, vehicle function manager 115 can perform method 300 at intervals of approximately 20 to 50 milliseconds.

Referring back to FIG. 3, in operation 305, the vehicle function manager obtains modification data. Modification data can include information associated with modifying a vehicle function (e.g., heating or cooling the vehicle cabin) associated with a cabin HVAC subsystem. For example, in some embodiments, modification data can include program instructions that indicate a manner in which the vehicle function is to be modified. For example, in some instances, such program instructions can indicate that cooling of a vehicle cabin by the cabin HVAC subsystem is to be reduced by a predetermined extent (e.g., changing a vehicle cabin temperature setting from 18° C. to 25° C.). In some instances, such program instructions can indicate that such cooling of the vehicle cabin is to be terminated (e.g., deactivated).

In some embodiments, modification data can include modification criteria substantially similar to that discussed with respect to FIG. 2. In an example, in some embodiments, modification criteria can include determining that a coolant temperature does not fall below a threshold temperature before reducing or terminating a cabin heating function of the cabin HVAC subsystem. In some embodiments, modification data can be selected by an entity, such as a programmer of the vehicle function manager, and stored in memory of a computing device, such as a computing device of a system controller.

In operation 310, the vehicle function manager obtains vehicle activity data, as discussed with respect to operation 210, FIG. 2.

In operation 315, the vehicle function manager obtains available power data, as discussed with respect to operation 215, FIG. 2.

In operation 320, the vehicle function manager obtains power demand data, as discussed with respect to operation 220, FIG. 2.

In operation 325, the vehicle function manager determines whether a power threshold is exceeded, as discussed with respect to operation 225, FIG. 2. In response to determining that the threshold is exceeded, the vehicle function manager can proceed to operation 330. Alternatively, in response to determining that the threshold is not exceeded, the vehicle function manager can proceed to operation 340.

In operation 330, the vehicle function manager selects a modification. In some embodiments, the vehicle function manager selects a modification based, at least in part, on the modification data obtained in operation 305. For example, in some embodiments, the vehicle function manager selects a modification that satisfies modification criteria. In some embodiments, the vehicle function manager selects the modification based, at least in part, on power demand data obtained in operation 320. For example, in some embodiments, the vehicle function manager can select to reduce, rather than terminate, a cabin heating function for instances in which such reducing can resolve an available-power deficit. In this way, the vehicle function manager can sufficiently increase the available power of the power supply without deactivating a vehicle function. Operation 330 can include the vehicle function manager determining a quantity of power that can be made available by implementing the modification.

In operation 335, the vehicle function manager initiates the selected modification. In some embodiments, operation 335 can include the vehicle function manager issuing one or more program instructions to a system controller of the vehicle. Such program instructions can command the system controller to modify the heating or cooling function of the cabin HVAC subsystem. In some embodiments, operation 335 can include the vehicle function manager issuing one or more program instructions to the cabin HVAC subsystem. The one or more program instructions can command the cabin HVAC subsystem to modify its heating or cooling function. Operation 335 can include the vehicle function manager storing data to memory (e.g., to memory of the system controller) indicating that the set of modifications is initiated.

In an example, a vehicle can include a HVAC subsystem that includes a resistive heater. While heating the vehicle cabin at 100% capacity, the resistive heater can demand 20 kW of power from the power supply of the vehicle. In operation 335, the vehicle function manager can issue program instructions to the cabin HVAC subsystem to reduce heating by the resistive heater to 50% capacity. By initiating this modification, the vehicle function manager can reduce the demand by the HVAC subsystem of the power supply from 20 kW to 10 kW. Accordingly, in this example, the modification can increase by 10 kW the quantity of power supply power available to a different vehicle subsystem, such as the traction subsystem.

In operation 340, the vehicle function manager determines if a set of modifications is initiated. For example, in some embodiments, the vehicle function manager can obtain stored data from memory (e.g., memory of the system controller) indicating whether a set of modifications is initiated. In response to determining that a set of modifications is initiated, the vehicle function manager can proceed to operation 345. Alternatively, in response to determining that a set of modifications is not initiated, the vehicle function manager can proceed to operation 310.

In operation 345, the vehicle function manager disables, or removes, the set of modifications. In this way, the vehicle functions can revert to an unmodified state. In such an unmodified state, the vehicle subsystems of the vehicle can demand power from the power supply without limitation by the vehicle function manager. Continuing with the example discussed above, operation 345 can include the vehicle function manager permitting the HVAC subsystem to return to heating the vehicle cabin at 100% capacity and demanding 20 kW of power from the power supply of the vehicle.

Figure 4A:
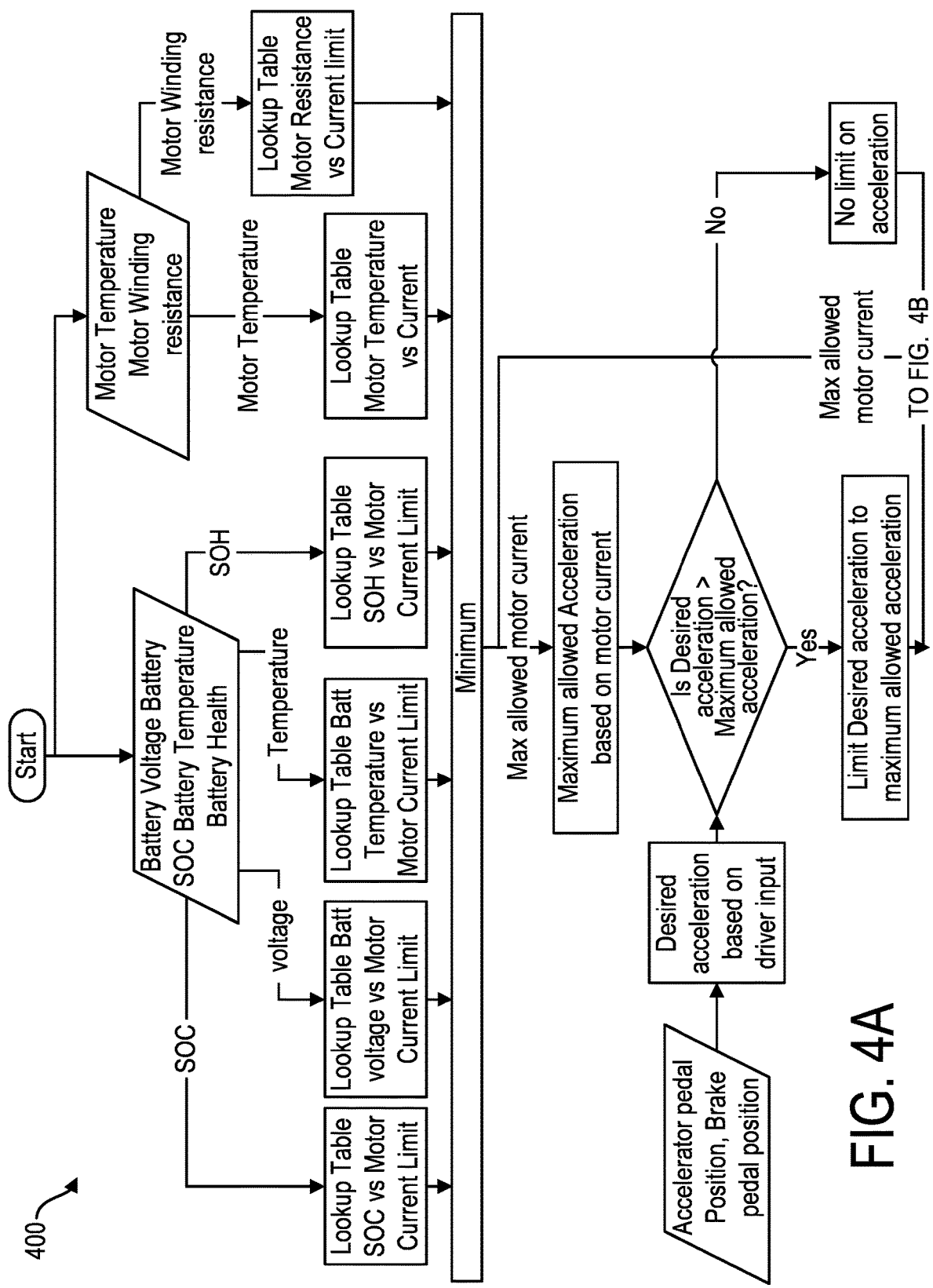
FIGS. 4A-4C depict an example control logic 400, in accordance with embodiments of the present disclosure.
Figure 4B:
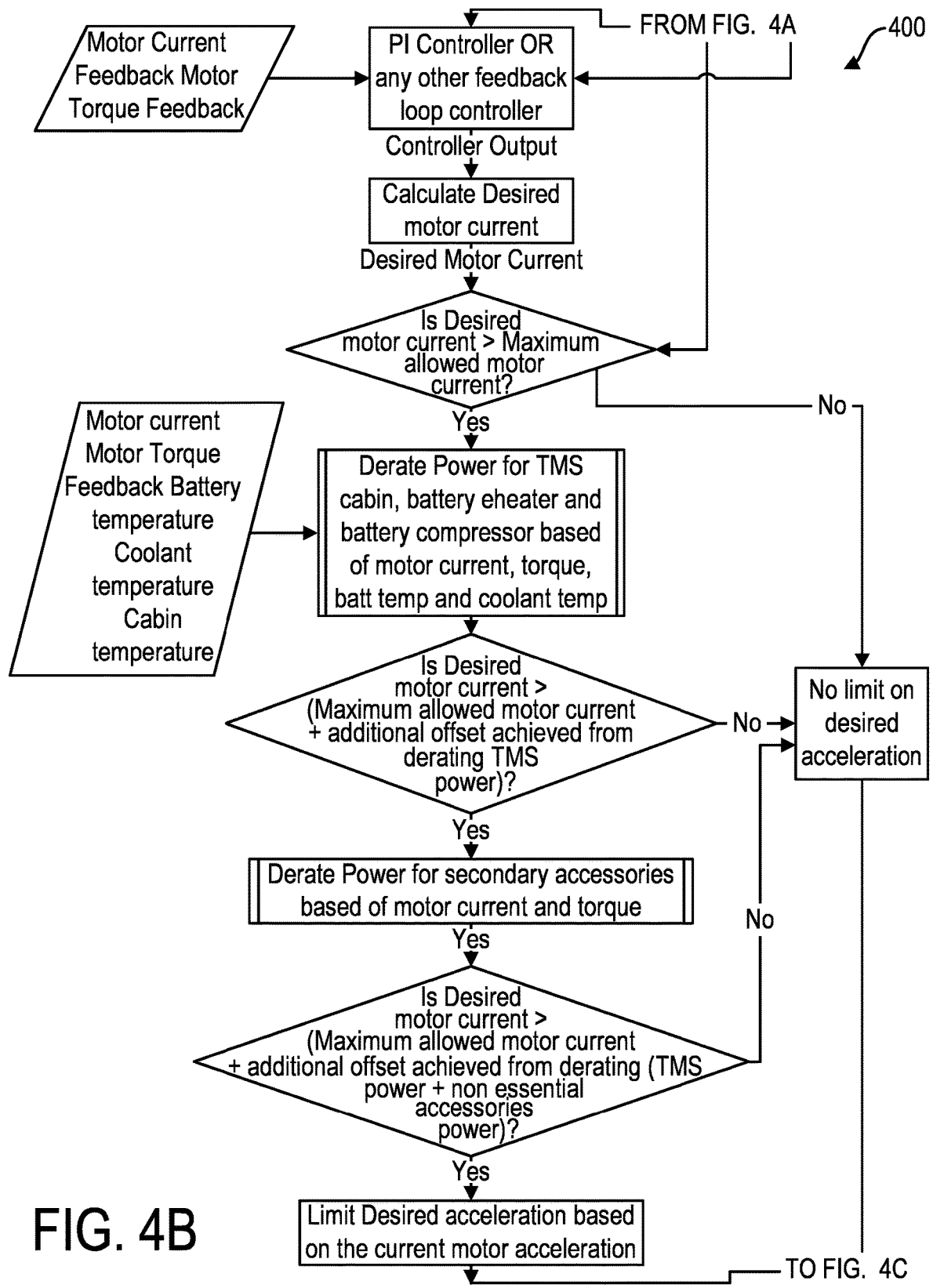
Figure 4C:
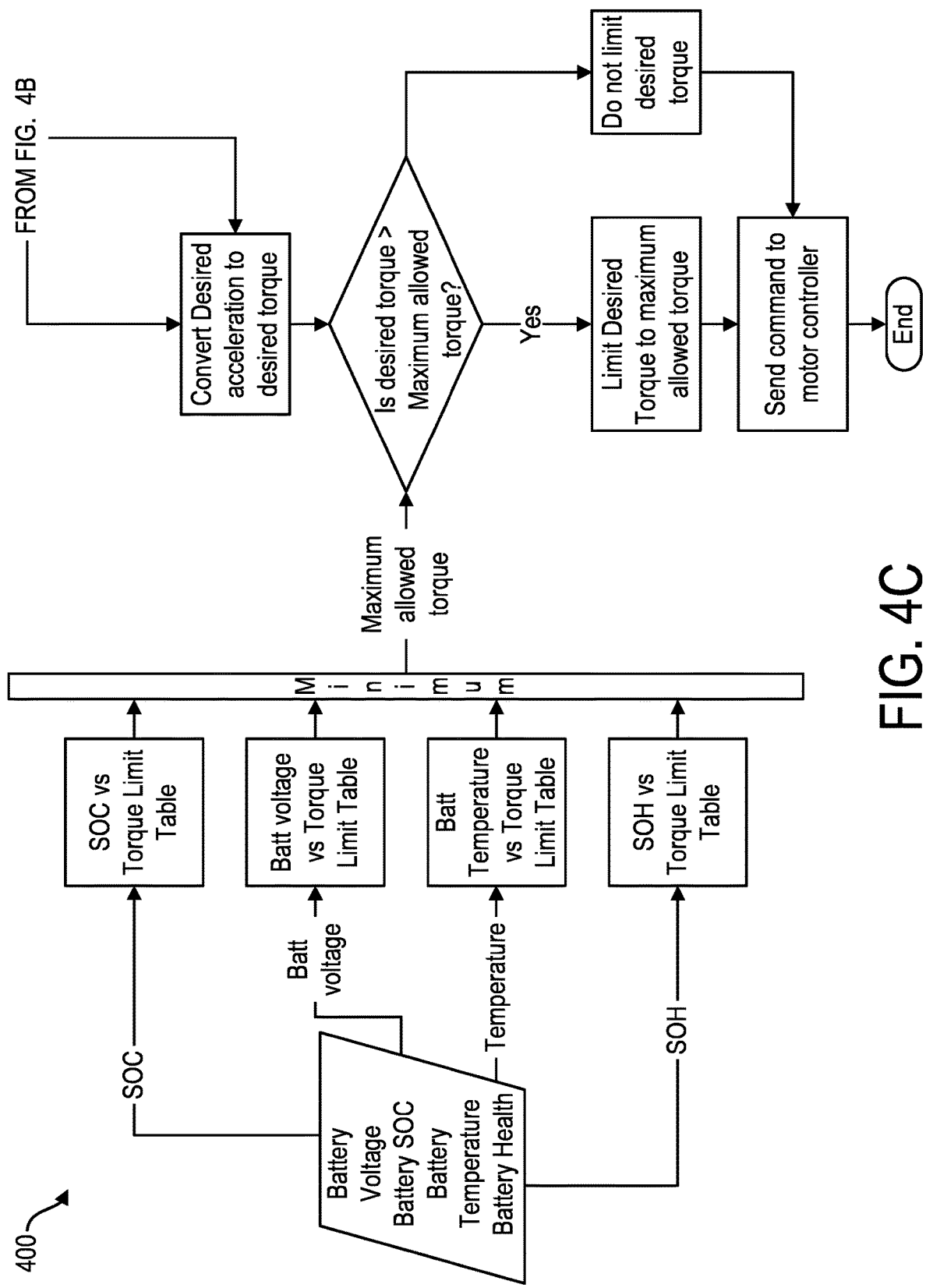

FIGS. 4A-4C illustrate an example control logic 400, according to embodiments of the present disclosure. In some embodiments, vehicle function manager 115 can perform operations of control logic 400 automatically. In some embodiments, vehicle function manager 115 can perform operations of control logic 400 continuously or intermittently. In an example, vehicle function manager 115 can perform operations of control logic 400 at intervals of approximately 20 to 50 milliseconds.

With respect to control logic 400, embodiments of the present disclosure can perform operations, such as those discussed below, to manage the slew rate of an electric vehicle (e.g., vehicle 105, FIG. 1). Managing the slew rate of an electric vehicle can include controlling how quickly the vehicle's speed and/or acceleration can change over time. In some embodiments, the vehicle function manager can obtain vehicle data from one or more vehicle subsystems (e.g., vehicle subsystems 160, FIG. 1). For example, the vehicle function manager can obtain motor temperature, motor winding resistance, motor current, motor/torque constant (e.g., a value indicating an amount of torque generated by the motor per unit of current flowing through the motor), motor current feedback, and/or motor torque feedback from a vehicle motor (e.g., from sensors associated with a vehicle motor); battery voltage, state of charge, state of health, and/or temperature from a battery management system; accelerator and/or brake pedal position from a pedal position sensor; and coolant temperature and/or cabin temperature from a thermal management subsystem and/or cabin HVAC subsystem. Based, at least in part, on the vehicle data, the vehicle function manager can determine a maximum allowed motor current. Determining the maximum allowed motor current can include the vehicle function manager obtaining stored information (e.g., lookup tables stored in memory of a system controller) correlating one or more types of vehicle data to one or more respective current limits. Additionally, the determining can include the vehicle function manager selecting the lowest current limit among the one or more respective current limits to be the maximum allowed motor current.

Next, the vehicle function manager can calculate a maximum allowed acceleration based on the maximum allowed motor current. The vehicle function manager can also obtain a desired acceleration based, at least in part, on vehicle data such as accelerator pedal position and/or brake pedal position. The vehicle function manager can then determine whether the desired acceleration is greater than the maximum allowed acceleration. In response to determining that the desired acceleration is not greater than the maximum allowed acceleration, the vehicle function manager can refrain from applying an acceleration limit. In response to determining that the desired acceleration is greater than the maximum allowed acceleration, the vehicle function manager can limit the desired acceleration such that it does not exceed the maximum allowed acceleration.

Next, the vehicle function manager can account for present vehicle motion (e.g., acceleration) by analyzing the motor current and/or motor torque with respect to time. For example, in some embodiments, the vehicle function manager can calculate the desired motor current by calculating a difference between (1) a desired torque calculated from a desired acceleration and (2) a feedback torque from the motor at a time (e.g., a present time). The vehicle function manager can then convert the difference into the desired motor current using a motor constant. In another example, the vehicle function manager can calculate a torque error and input the torque error into a proportional integrator. From the proportional integrator, the vehicle function manager can receive a desired motor torque (e.g., desired motor torque=(Kp×error)+(Ki×integral of error), where Kp and Ki are proportional and integral constants selected by a user based on the tuning exercise). Additionally in this example, the vehicle function manager can convert the desired motor torque to desired motor current.

Next, the vehicle function manager can determine whether the desired motor current is greater than the maximum allowed motor current. In response to determining that the desired motor current is not greater than the maximum allowed motor current, the vehicle function manager can refrain from applying an acceleration limit. In response to determining that the desired motor current is greater than the maximum allowed motor current, the vehicle function manager can derate (e.g., reduce), at a first time, power for one or more vehicle functions such that additional power can be made available for use by the motor. In response to such derating, the vehicle function manager can determine whether the desired motor current is greater than the sum of the maximum allowed motor current and additional current corresponding to the additional power made available by the derating. In response to determining that the sum is not greater than the maximum allowed motor current, the vehicle function manager can refrain from applying an acceleration limit. In response to determining that the sum is greater than the maximum allowed motor current, the vehicle function manager can derate, at a second time subsequent to the first time, power for one or more additional vehicle functions such that additional power can be made available for use by the motor. In response to such derating at the second time, the vehicle function manager can determine whether the desired motor current is greater than the sum of the maximum allowed motor current and additional current corresponding to the additional power made available by the derating at the second time. In response to determining that the sum is not greater than the maximum allowed motor current, the vehicle function manager can refrain from applying an acceleration limit. In response to determining that the sum is greater than the maximum allowed motor current, the vehicle function manager can limit the desired acceleration. For example, the vehicle function manager can limit the desired acceleration such that the motor acceleration of the vehicle at the present time is not exceeded.

Next, the vehicle function manager can assess whether to limit the vehicle torque. Accordingly, the vehicle function manager can convert the desired acceleration to a desired torque. Based, at least in part, on the vehicle data, the vehicle function manager can determine a maximum allowed motor torque. Determining the maximum allowed motor torque can include the vehicle function manager obtaining stored information (e.g., lookup tables) correlating one or more types of vehicle data to one or more respective torque limits. Additionally, the determining can include the vehicle function manager selecting the lowest torque limit among the one or more respective torque limits to be the maximum allowed motor torque. The vehicle function manager can then determine whether the desired torque is greater than the maximum allowed motor torque. In response to determining that the desired torque is not greater than the maximum allowed motor torque, the vehicle function manager can refrain from applying a torque limit. In response to determining that the desired torque is greater than the maximum allowed motor torque, the vehicle function manager can limit the desired torque such that it does not exceed the maximum allowed motor torque. The vehicle function manager is further configured to issue commands to one or more subsystems (e.g., transmit data to a motor controller) for derating power and/or limiting acceleration and/or torque.

The following is a nonlimiting working example of the vehicle function manager implementing control logic 400 in the operation of a vehicle. The vehicle function manager obtains the following information from a battery management system: battery voltage (700V), battery state of charge (70%), battery temperature (25° C.), and battery state of health (90%). Additionally, the vehicle function manager obtains the following information from a vehicle motor: motor temperature (35° C.) and motor winding resistance (0.1 ohms). Using a set of lookup tables obtained from a system controller, the vehicle function manager identifies that the battery voltage (700V) corresponds to a motor current limit of 250 A; the battery state of charge (70%) corresponds to a motor current limit of 280 A; the battery temperature (25° C.) corresponds to a motor current limit of 275 A; the battery state of health (90%) corresponds to a motor current limit of 260 A; the motor temperature (35° C.) corresponds to a motor current limit of 300 A; and the motor winding resistance (0.1 ohms) corresponds to a motor current limit of 300 A. Based on these values, the vehicle function manager selects the lowest of the current limits (i.e., 250 A) to be the maximum allowed motor current.

Continuing with this example, the vehicle function manager calculates a maximum allowed acceleration of 3.33 m/s$^2$ according to the following: (maximum allowed acceleration=(maximum allowed motor current/motor constant)/vehicle mass), where maximum allowed motor current is 250 A, motor constant is 0.05 Nm/A, and vehicle mass is 1500 kg. Next, the vehicle function manager obtains a desired acceleration (i.e., 4 m/s$^2$) of the vehicle and determines that the desired acceleration is greater than the maximum allowed acceleration (i.e., 3.33 m/s$^2$). In response, the vehicle function manager proceeds to the calculations discussed below.

Continuing with this example, the vehicle function manager obtains motor torque feedback information with respect to time from the motor. By a feedback loop controller (e.g., a proportional integrator) of the vehicle function manager, the vehicle function manager calculates a torque error of 200 Nm. In this example, the torque error is the difference between a desired torque and a feedback torque value included in the motor torque feedback information. The vehicle function manager calculates the desired torque according to the following: (desired torque=maximum allowed acceleration×vehicle mass×wheel radius). Based on the torque error, the vehicle function manager calculates a desired motor current corresponding to the torque error according to the following: (desired motor current=torque error/motor constant). Accordingly, the vehicle function manager calculates a desired motor current of 300 A.

Continuing with this example, in response to determining that the desired motor current (i.e., 300 A) is greater than the maximum allowed motor current (i.e., 250 A) the vehicle function manager reduces by 40 A the current available to the cabin electric heater of the vehicle. Next, the vehicle function manager determines that the desired motor current (i.e., 300 A) is greater than the sum of the additional current made available to the motor (i.e., 40 A) and the maximum allowed motor current (i.e., 250 A). In response to this determination, the vehicle function manager disables, for a period of time, high-voltage interior lighting of the vehicle. The modification of the high voltage interior lighting permits an additional current of 5 A to be available to the motor. Continuing with this example, in response to determining that the desired motor current (i.e. 300 A) is greater than the sum of the additional current made available to the motor (i.e., 40 A+5 A) and the maximum allowed motor current (i.e., 250 A), the vehicle function manager limits the desired motor current to 295 A, which corresponds to limiting the desired acceleration to 3.93 m/s$^2$. In this example, vehicle function manager modified the cabin electric heater of the vehicle before modifying the high-voltage interior lighting because the cabin electric heater had a lower priority ranking than the high-voltage interior lighting had.

Continuing with this example, the vehicle function manager analyzes limiting vehicle torque. The vehicle function manager converts the desired acceleration to a desired torque according to the following: (desired torque=desired acceleration×vehicle mass×wheel radius), where desired acceleration is 3.93 m/s$^2$, vehicle mass is 1500 kg, and radius is 0.4 m. Accordingly, the vehicle function manager calculates a desired torque of 2340 Nm. Additionally, based on the information the vehicle function manager obtains from the battery management system (discussed above), the vehicle function manager obtains the following data from lookup tables: the battery voltage (700V) corresponds to a torque limit of 2800 Nm; the battery state of charge (70%) corresponds to a torque limit of 3000 Nm; the battery temperature (25° C.) corresponds to a torque limit of 2900 Nm; and the battery state of health (90%) corresponds to a torque limit of 3000 Nm. Based on these values, the vehicle function manager selects the lowest of the torque limits (i.e., 2800 Nm) to be the maximum allowed torque limit. Next, the vehicle function manager determines that the desired torque (i.e., 2340 Nm) is not greater than the maximum allowed torque (i.e., 2800 Nm). In response to such determination, the vehicle function manager does not limit the desired torque.

Accordingly, embodiments of the present disclosure can dynamically and efficiently limit the slew rate of an electric vehicle by adjusting the acceleration and torque demand based on combination of factors such as battery SOC, battery voltage, battery temperature, SOH, motor temperature, and/or motor winding resistance. Additionally, embodiments of the present disclosure can automatically reduce the power/current demand from a thermal management system and secondary electronic accessories to provide maximum power to the traction system. Management of the slew rate as discussed herein can improve reliability and operation efficiency of the vehicle battery.

Figure 5:
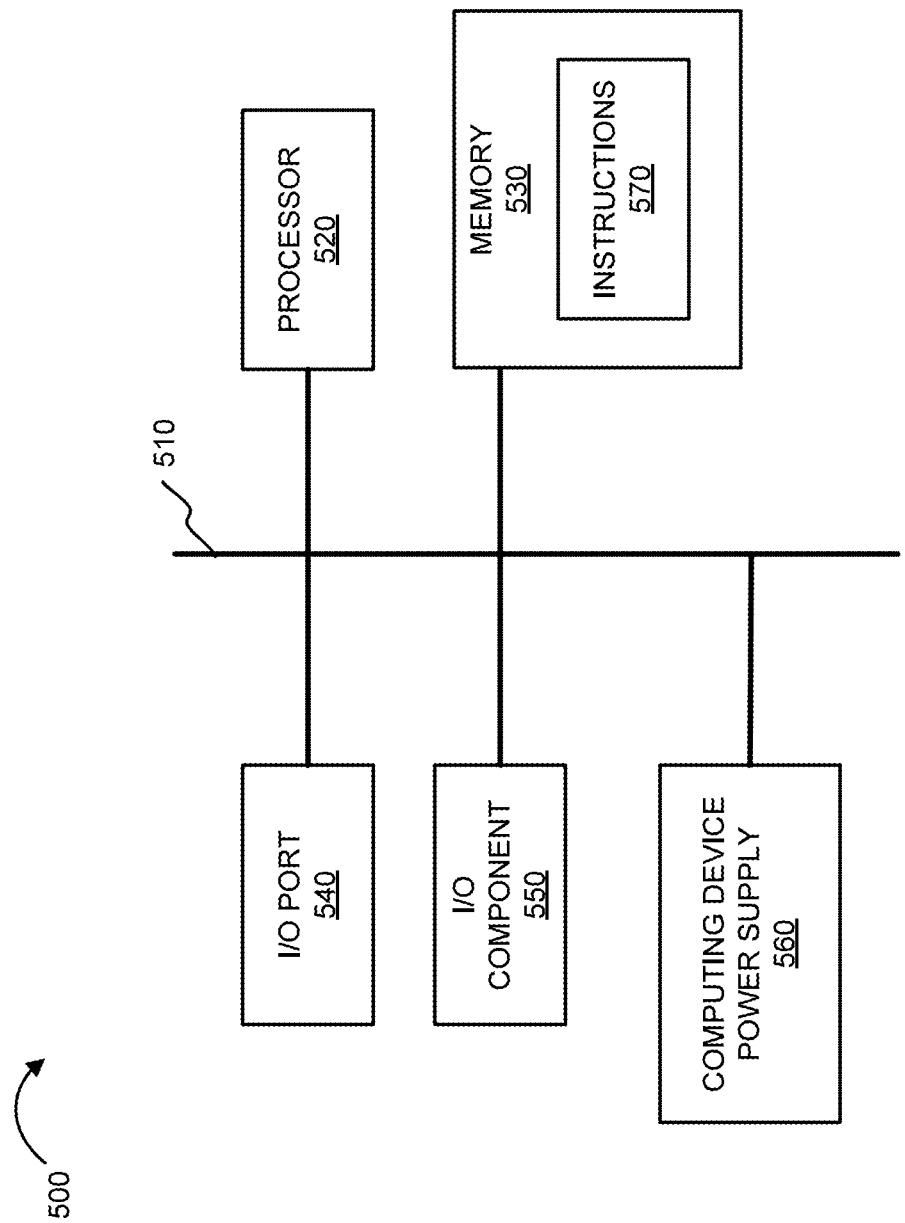
FIG. 5 depicts an example computing device that can be used in accordance with embodiments of the present disclosure.

FIG. 5 is a block diagram depicting an illustrative computing device 400, in accordance with embodiments of the disclosure. The computing device 400 may include any type of computing device suitable for implementing aspects of embodiments of the disclosed subject matter. Each of the various components shown and described in the Figures can contain their own dedicated set of computing device components, such as those shown in FIG. 4 and described below. For example, the system controller 110, FIG. 1 and the thermal management subsystem 130, FIG. 1 can each include a set of components shown in FIG. 4 and described below.

In embodiments, the computing device 400 includes a bus 410 that, directly and/or indirectly, couples one or more of the following devices: a processor 420, a memory 430, an input/output (I/O) port 440, an I/O component 450, and a computing device power supply 460. Any number of additional components, different components, and/or combinations of components may also be included in the computing device 400.

The bus 410 represents what may be one or more busses (such as, for example, an address bus, data bus, or combination thereof). Similarly, in embodiments, the computing device 400 may include a number of processors 420, a number of memory components 430, a number of I/O ports 440, a number of I/O components 450, and/or a number of power supplies 460. Additionally, any number of these components, or combinations thereof, may be distributed and/or duplicated across a number of computing devices.

In embodiments, the memory 430 includes computer-readable media in the form of volatile and/or nonvolatile memory and may be removable, nonremovable, or a combination thereof. Media examples include random access memory (RAM); read only memory (ROM); electronically erasable programmable read only memory (EEPROM); flash memory; optical or holographic media; magnetic cassettes, magnetic tape, magnetic disk storage or other magnetic storage devices; data transmissions; and/or any other medium that can be used to store information and can be accessed by a computing device. In embodiments, the memory 430 stores computer-executable instructions 470 for causing the processor 420 to implement aspects of embodiments of components discussed herein and/or to perform aspects of embodiments of methods and procedures discussed herein. The memory 430 can comprise a non-transitory computer readable medium storing the computer-executable instructions 470.

The computer-executable instructions 470 may include, for example, computer code, machine-useable instructions, and the like such as, for example, program components capable of being executed by one or more processors 420 (e.g., microprocessors) associated with the computing device 400. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 470 may be configured to be executed by the processor 420 and, upon execution, to cause the processor 420 to perform certain processes. In certain embodiments, the processor 420, memory 430, and instructions 470 are part of a controller such as an application specific integrated circuit (ASIC), field-programmable gate array (FPGA), and/or the like. Such devices can be used to carry out the functions and steps described herein.

The I/O component 450 may include a presentation component configured to present information to a user such as, for example, a display device, a speaker, and/or the like, and/or an input component such as, for example, a microphone, a wireless device, a keyboard, a voice input device, a touch input device, a touch-screen device, an interactive display device, a mouse, and/or the like.

The devices and systems described herein can be communicatively coupled via a network, which may include a controller area network (CAN), local area network (LAN), a wide area network (WAN), a cellular data network, via the internet using an internet service provider, and the like.

Aspects of the present disclosure are described with reference to flowchart illustrations and/or block diagrams of methods, devices, systems, and computer program products. It will be understood that each block of the flowchart illustrations and/or block diagrams, and combinations of blocks in the flowchart illustrations and/or block diagrams, can be implemented by computer program instructions.

Various modifications and additions can be made to the exemplary embodiments discussed without departing from the scope of the disclosed subject matter. For example, while the embodiments described above refer to particular features, the scope of this disclosure also includes embodiments having different combinations of features and embodiments that do not include all of the described features. Accordingly, the scope of the disclosed subject matter is intended to embrace all such alternatives, modifications, and variations as fall within the scope of the claims, together with all equivalents thereof.

We claim:

1. A method of managing multiple vehicle functions according to power demand of a set of vehicle subsystems, comprising:
    receiving available power data indicating an available power of a battery of a vehicle, the vehicle comprising the set of vehicle subsystems, including a traction system and one or more auxiliary subsystems;
    receiving demand data indicating a power demand of the battery by the set of vehicle subsystems, the set of vehicle subsystems configured to perform a set of vehicle functions of the vehicle;
    receiving modification data associated with modifying the set of vehicle functions, the modification data including (i) instructions for reducing power consumption of one or more auxiliary subsystems, (ii) a ranking of the set of vehicle functions prioritizing the traction system relative to auxiliary subsystems during a power deficit, and (iii) modification criteria specifying conditions to be met before initiating a modification;
    obtaining, based on operator input, an intention to perform a power-intensive driving maneuver;
    obtaining, at a first time, based on the demand data and the available power data, that the power demand to perform the power-intensive driving maneuver exceeds the available power;
    selecting, in response to the obtaining at the first time, a set of target vehicle functions among the auxiliary subsystems;
    selecting, based at least in part on the modification data, a set of modifications for the set of target vehicle functions, including selecting according to the ranking of the set of vehicle functions; and
    initiating, in accordance with the modification data, the set of modifications by reducing power consumption of the set of target vehicle functions to make additional power available to the traction system, and deferring initiation of a modification until the modification criteria are satisfied, wherein the modification criteria include a determination that the available power is insufficient to satisfy the power demand.

2. The method of claim 1, wherein the selecting the set of target vehicle functions is based, at least in part, on the ranking of the set of vehicle functions.

3. The method of claim 2, wherein the set of vehicle functions comprises a first vehicle function and a second vehicle function,
wherein the set of rankings comprises a first ranking for the first vehicle function and a second ranking for the second vehicle function;
the method further comprising:
determining that the first ranking has a lower priority than the second ranking; and
selecting the first vehicle function as a target vehicle function of the set of target vehicle functions, based on the determining that the first ranking has a lower priority than the second ranking.

4. The method of claim 1, wherein the set of vehicle subsystems comprises a cabin HVAC subsystem having a heating function, and
wherein the initiating the set of modifications comprises reducing the heating function or terminating the heating function.

5. The method of claim 1, further comprising:
determining at a second time subsequent to the first time that the power demand does not exceed the available power, and
in response to the determining at the second time, disabling the set of modifications.

6. The method of claim 1, wherein the method further comprises:
receiving activity data of the vehicle;
determining, based on the activity data, that the modification criteria is satisfied; and
performing the initiating the set of modifications to the set of target vehicle functions in response to the determining that the modification criteria is satisfied.

7. The method of claim 6, wherein the activity data comprises a temperature of a coolant fluid of the vehicle.

8. A controller of a vehicle comprising:
a processor; and
a memory in communication with the processor, the memory containing program instructions that, when executed by the processor, are configured to cause the processor to perform a method of managing multiple vehicle functions according to power demand of a set of vehicle subsystems, the method comprising:
receiving available power data indicating an available power of a battery of the vehicle, the vehicle comprising the set of vehicle subsystems;
receiving demand data indicating a power demand of the battery by the set of vehicle subsystems, the set of vehicle subsystems configured to perform a set of vehicle functions of the vehicle;
receiving modification data associated with modifying the set of vehicle functions, the modification data including (i) instructions for reducing power consumption of one or more auxiliary subsystems, (ii) a ranking of the set of vehicle functions prioritizing a traction system, and (iii) modification criteria specifying conditions to be met before initiating a modification;
obtaining, based on operator input, an intention to perform a power-intensive driving maneuver;
obtaining, at a first time, based on the demand data and the available power data, that the power demand to perform the power-intensive driving maneuver exceeds the available power;
selecting, in response to the obtaining at the first time, a set of target vehicle functions among the auxiliary subsystems;
selecting, based at least in part on the modification data, a set of modifications for the set of target vehicle functions, including selecting according to the ranking of the set of vehicle functions; and
initiating, in accordance with the modification data, the set of modifications by reducing power consumption of the set of target vehicle functions to make additional power available to the traction system, and deferring initiation of a modification until the modification criteria are satisfied, wherein the modification criteria include a determination that the available power is insufficient to satisfy the power demand.

9. The controller of claim 8, wherein the selecting the set of target vehicle functions is based, at least in part, on the set of rankings.

10. The controller of claim 9, wherein the set of vehicle functions comprises a first vehicle function and a second vehicle function,
wherein the set of rankings comprises a first ranking for the first vehicle function and a second ranking for the second vehicle function;
the method further comprising:
determining that the first ranking has a lower priority than the second ranking; and
selecting the first vehicle function as a target vehicle function of the set of target vehicle functions, based on the determining that the first ranking has a lower priority than the second ranking.

11. The controller of claim 8, wherein the set of vehicle subsystems comprises a cabin HVAC subsystem having a heating function, and
wherein the initiating the set of modifications comprises reducing the heating function.

12. The controller of claim 11, wherein the initiating the set of modifications comprises terminating the heating function.

13. The controller of claim 8, the method further comprising:
determining at a second time subsequent to the first time that the power demand does not exceed the available power, and
in response to the determining at the second time, disabling the set of modifications.

14. The controller of claim 8, wherein the modification data includes modification criteria; and
wherein the method further comprises:
receiving activity data of the vehicle;
determining, based on the activity data, that the modification criteria is satisfied; and
performing the initiating the set of modifications to the set of target vehicle functions in response to the determining that the modification criteria is satisfied.

15. The controller of claim 14, wherein the activity data comprises a temperature of a coolant fluid of the vehicle.

16. A system of a vehicle comprising:
a set of vehicle subsystems, the set of vehicle subsystems including a cabin HVAC subsystem; and
a controller configured to perform a method of managing multiple vehicle functions according to power demand of the set of vehicle subsystems, comprising:
receiving available power data indicating an available power of a battery of the vehicle;
receiving demand data indicating a power demand of the battery by the set of vehicle subsystems, the set of vehicle subsystems configured to perform a set of vehicle functions of the vehicle;

receiving modification data associated with modifying the set of vehicle functions, the modification data including (i) instructions for reducing power consumption of one or more auxiliary subsystems, (ii) a ranking of the set of vehicle functions prioritizing a traction system, and (iii) modification criteria specifying conditions to be met before initiating a modification;

obtaining, based on operator input, an intention to perform a power-intensive driving maneuver;

obtaining, at a first time, based on the demand data and the available power data, that the power demand to perform the power-intensive driving maneuver exceeds the available power;

selecting, in response to the obtaining at the first time, a set of target vehicle functions among the auxiliary subsystems;

selecting, based at least in part on the modification data, a set of modifications for the set of target vehicle functions, including selecting according to the ranking of the set of vehicle functions; and initiating, in accordance with the modification data, the set of modifications by reducing power consumption of the set of target vehicle functions to make additional power available to the traction system, and deferring initiation of a modification until the modification criteria are satisfied, wherein the modification criteria include a determination that the available power is insufficient to satisfy the power demand.

17. The system of claim 16, the method further comprising:
determining at a second time subsequent to the first time that the power demand does not exceed the available power, and
in response to the determining at the second time, disabling the set of modifications.

18. The system of claim 16, wherein the cabin HVAC subsystem has a heating function, and
wherein the initiating the set of modifications comprises reducing the heating function.

19. The system of claim 18, wherein the initiating the set of modifications comprises terminating the heating function.

20. The method of claim 1, further comprising restoring the set of target vehicle functions upon determining that the available power is sufficient to satisfy the power demand.

* * * * *